US012179225B2

(12) United States Patent
Allen et al.

(10) Patent No.: US 12,179,225 B2
(45) **Date of Patent: *Dec. 31, 2024**

(54) SPRINKLER GUARD FOR A FIRE PROTECTION SPRINKLER AND A METHOD OF MANUFACTURING A SPRINKLER GUARD

(71) Applicant: The Reliable Automatic Sprinkler Co. Inc., Liberty, SC (US)

(72) Inventors: Myron Allen, Westminster, SC (US); Nathan Chad Stewart, Liberty, SC (US); Steven D. Wolin, Clemson, SC (US)

(73) Assignee: The Reliable Automatic Sprinkler Co. Inc., Liberty, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,372

(22) Filed: Nov. 14, 2023

(65) Prior Publication Data

US 2024/0082868 A1 Mar. 14, 2024

Related U.S. Application Data

(63) Continuation of application No. 18/171,708, filed on Feb. 21, 2023, now Pat. No. 11,845,097, which is a
(Continued)

(51) Int. Cl.

| | |
|---|---|
| ***B05B 15/16*** | (2018.01) |
| ***A62C 31/02*** | (2006.01) |
| ***A62C 35/68*** | (2006.01) |

(52) U.S. Cl.
CPC .............. *B05B 15/16* (2018.02); *A62C 31/02* (2013.01); *A62C 35/68* (2013.01)

(58) Field of Classification Search
CPC .......... B05B 15/16; A62C 35/68; A62C 31/02
(Continued)

(56) References Cited

U.S. PATENT DOCUMENTS

| | | | |
|---|---|---|---|
| 1,075,053 | A | 10/1913 | Moore |
| 1,469,336 | A | 10/1923 | Rowley |

(Continued)

FOREIGN PATENT DOCUMENTS

| | | | |
|---|---|---|---|
| KR | 100821215 | B1 | 4/2008 |
| KR | 20100053497 | A | 5/2010 |
| WO | 2015/059143 | A1 | 4/2015 |

OTHER PUBLICATIONS

"Approval Standard for Suppression Mode [Early Suppression—Fast Response (ESFR)] Automatic Sprinklers," FM Approvals, Oct. 2006, Class 2008, pp. 1 to 83.

(Continued)

*Primary Examiner* — Steven J Ganey
(74) *Attorney, Agent, or Firm* — Venable LLP

(57) ABSTRACT

A sprinkler guard, mountable to a fire protection sprinkler, includes a first plate with projections from the first plate in a first lateral direction orthogonal to a central axis, and a lower surface facing a downward direction opposite to the upward direction, a second plate with projections from the second plate in a second lateral direction opposite to the first, and a lower surface facing the downward direction, first and second legs having an upper end attached to the lower surface of the first plate, a middle portion extending in the downward direction, and a lower end, third and fourth legs having an upper end attached to the lower surface of the second plate, a middle portion extending in the downward direction, and a lower end. A circular ring is attached to the lower ends of the first to fourth legs, and the legs are spaced about the circular ring.

24 Claims, 11 Drawing Sheets

Related U.S. Application Data continuation of application No. 17/172,381, filed on Feb. 10, 2021, now Pat. No. 11,612,905, which is a continuation of application No. 16/436,415, filed on Jun. 10, 2019, now Pat. No. 10,919,066.

(60) Provisional application No. 62/682,330, filed on Jun. 8, 2018.

(58) Field of Classification Search
USPC ............................ 169/37–41, 51, 90, 43, 46; 239/288–288.5
See application file for complete search history.

(56) References Cited

U.S. PATENT DOCUMENTS

| | | | | | |
|---|---|---|---|---|---|
| 2,511,945 | A * | 6/1950 | Rowley | A62C 37/12 169/42 |
| 3,514,040 | A | 5/1970 | Carson | |
| 3,727,695 | A * | 4/1973 | Danton | A62C 37/08 169/37 |
| 3,797,746 | A | 3/1974 | Gray et al. | |
| 4,951,755 | A | 8/1990 | Barnett et al. | |
| 5,570,745 | A * | 11/1996 | MacDonald, III | A62C 35/68 169/37 |
| 5,632,339 | A | 5/1997 | Fenske et al. | |
| 5,667,017 | A | 9/1997 | Hoffmann et al. | |
| 5,893,418 | A | 4/1999 | Ponte | |
| D507,328 | S | 7/2005 | Clive | |
| 9,522,292 | B2 | 12/2016 | Feenstra | |
| 10,919,066 | B2 | 2/2021 | Allen et al. | |
| 11,612,905 | B2 | 3/2023 | Allen et al. | |
| 2011/0290508 | A1 | 12/2011 | Hunsberger | |
| 2014/0361100 | A1 | 12/2014 | Hunsberger | |

OTHER PUBLICATIONS

"Standard for the Installation of Sprinkler Systems," NFPA 13 Chapter 8, National Fire Protection Association (Quincy Massachusetts), 2012, pp. 1 to 100.

"Standard for Safety: Early-Suppression Fast-Response Sprinklers," UL 1767, Apr. 30, 2013, Fourth Edition, pp. 1 to 66.

"Fire Sprinkler Cages," Bulk Industries, Inc., 2 pages, http://www/enexia.fi/products/sprinkler-accessories/sprinkler-head-guards/other-head-guards/?land-en (Accessed Aug. 10, 2017).

"Red Head Guard," SupplyHouse.com, 7 pages, http://www.supplyhouse/com/FPPI-02-600-1-Piece-Red-Head-Guard?gclid=Cj0KCQjwiLDMBRDFARIsAACNmix_5_3JG6pJIWjbQlk-usy966Lxv4MXEBu8tcpj6C6yW2r53Wfeq_pMaAqp6EALw_wcB (Accessed Aug. 10, 2017).

"Fire-Mech Sprinkler Head Guards," fire-mechfixings.com.uk, 3 pages, http://fire-mechfixings.co.uk/products/fire-sprinkler-products/sprinkler-head-guards/ (Accessed Aug. 11, 2017).

"Head Guards," 8 pages, http://www.enexia.fi/products/sprinkler-accessories/sprinkler-head-guards/other-head-guards/?lang=en (Accessed Aug. 11, 2017).

* cited by examiner

SPRINKLER GUARD FOR A FIRE PROTECTION SPRINKLER AND A METHOD OF MANUFACTURING A SPRINKLER GUARD

CROSS REFERENCE TO PRIORITY APPLICATION

This application is a continuation of U.S. patent application Ser. No. 18/171,708, filed Feb. 21, 2023, now U.S. Pat. No. 11,845,097, issued Dec. 19, 2023, which is a continuation of U.S. patent application Ser. No. 17/172,381, filed Feb. 10, 2021, now U.S. Pat. No. 11,612,905, issued Mar. 28, 2023, which is a continuation of U.S. patent application Ser. No. 16/436,415, filed Jun. 10, 2019, now U.S. Pat. No. 10,919,066, issued Feb. 16, 2021, which claims the benefit of U.S. Provisional Patent Application No. 62/682,330, filed on Jun. 8, 2018, each of which is incorporated herein by reference in its entirety.

FIELD OF THE INVENTION

Our invention generally relates to a sprinkler guard for protection of a fire protection sprinkler, and a method of manufacturing a sprinkler guard.

BACKGROUND OF THE INVENTION

Suppression mode automatic sprinklers are thermo-sensitive devices that are designed to operate at a predetermined temperature by releasing a stream of fluid, typically water, and distributing the fluid in a specified pattern (i.e., a spray pattern) and in a density over a designated area to achieve fire suppression when installed on appropriate sprinkler piping. Early-suppression, fast response (ESFR) fire protection sprinklers are defined in section 3.6.4.3 of Standard 13 issued by the National Fire Protection Association (NFPA 13), of Quincy, Massachusetts, United States, as "a type of fast-response sprinkler that has a thermal element with a response time index ("RTI") of 50 (meters-seconds)$^{1/2}$ or less and is listed for its capability to provide fire suppression of specific high-challenge fire hazards." ESFR sprinklers are also defined in terms of a suitable required-delivered-density (RDD), which is the minimum amount of water that must be delivered to a combustible fuel package in order to achieve suppression of a type of a fire for a given commodity.

Fire protection sprinkler systems that include ESFR fire protection sprinklers are subject to testing requirements set forth in various standards, such as Standard 1767 issued by Underwriter's Laboratories (UL 1767), of Northbrook, Illinois, United States, or Approval Standard 2008 issued by the Factory Mutual Global (FM Approval Standard 2008), of Johnston, Rhode Island, United States. The testing requirements set forth in these standards are based on a number of parameters, including, for example, the sprinkler specifications (e.g., the K-factor, which is the flow rate of a fluid through an outlet of the sprinkler, in gallons per minute, divided by the square root of the pressure loss through the sprinkler, in pounds per square inch), the orientation of the sprinkler, the type of coverage area, the hazard classification, the type of storage, the type of commodity, the storage height, the ceiling height, the sprinkler temperature rating, and the design density, among others.

For example, Section 51 of UL 1767 provides the testing requirements for large scale fire tests for ESFR sprinklers having nominal K-factors of 22.4 gpm/(psi)$^{1/2}$ (i.e., a K-22 ESFR sprinkler) or of 25.2 gpm/(psi)$^{1/2}$ (i.e., a K-25 ESFR sprinkler). In particular, water discharged from a K-22 sprinkler or a K-25 sprinkler shall be capable of controlling a large-scale fire based on the requirements set forth in Table 51.1, reproduced below.

TABLE 51.1

Pendent ESFR fire test requirements

| Criteria to be evaluated | Test requirements | |
|---|---|---|
| Nominal K-Factor, gpm/(psi)$^{1/2}$ | 14.0, 16.8, 22.4, and 25.2 | |
| Maximum number of sprinklers permitted to operate | One within the test series 9 | Remaining tests within the test series 8 |
| Maximum 1 minute average steel temperature, ° F. (° C.) | 1000 (538) | |
| Regrowth of fire | No signs of regrowth at the end of the test as evidenced by significantly increasing steel or gas temperatures at the ceiling | |
| Fire spread | No sustained combustion at the outer edge of the end of the main test array and none at the outer edges of the target array | |

The fire test conditions for a nominal K-22 ESFR sprinkler for use with a maximum ceiling height of 45 ft (13.7 m), as set forth in UL 1767, are listed in Table 51.3, reproduced below.

TABLE 51.3

Fire test conditions for nominal K-22.4 pendent ESFR sprinklers for use with a maximum ceiling height of 45 ft (13.7 m)

| | Test 1 | Test 2 | Test 3 | Test 4 | Test 5 | Test 6 | Test 7 |
|---|---|---|---|---|---|---|---|
| Storage Type | Double row rack | Double row rack | Double row rack | Double row rack | Double row rack | Double row rack | Double row rack |
| Commodity Type | Std. cartoned group A plastic | Std. cartoned group A plastic | Std. cartoned group A plastic | Std. cartoned group A plastic | Std. cartoned group A plastic | Std. cartoned group A plastic | Std. cartoned group A plastic |
| Test Array | See FIG. 51.1 | See FIG. 51.2 | See FIG. 51.1 | See FIG. 51.4 | See FIG. 51.5 | See FIG. 51.3 | See FIG. 51.2 |
| Nominal storage height, ft (m) | 20 (6.1) | 25 (7.6) | 20 (6.1) | 35 (10.7) | 40 (12.2) | 30 (9.1) | 25 (7.6) |
| Nominal ceiling height, ft (m) | 30 (9.1) | 30 (9.1) | 30 (9.1) | 45 (13.7) | Adjusted to achieve sprinkler to deflector to | 45 (13.7) | 45 (13.7) |

TABLE 51.3-continued

Fire test conditions for nominal K-22.4 pendent ESFR sprinklers for use with a maximum ceiling height of 45 ft (13.7 m)

| | Test 1 | Test 2 | Test 3 | Test 4 | Test 5 | Test 6 | Test 7 |
|---|---|---|---|---|---|---|---|
| | | | | | commodity clearance | | |
| Nominal clearance to deflector, ft (m) | 10 (3.0) | 5 (1.5) | 10 (3.0) | 10 (3.0) | 3 (0.9) | 15 (4.6) | 20 (6.1) |
| Sprinkler temperature rating | Minimum temperature rating | Maximum temperature rating | Minimum temperature rating | Minimum temperature rating | Minimum temperature rating | Minimum temperature rating | See Note 1 |
| Nominal deflector to ceiling distance, in (cm) | 14 (35.6) | Maximum specified by manufacturer | Maximum specified by manufacturer | 14 (35.6) | Maximum specified by manufacturer | Maximum specified by manufacturer | See Note 1 |
| Sprinkler spacing, ft × ft (m × m) | 10 × 10 (3.0 × 3.0) | 10 × 10 (3.0 × 3.0) | 10 × 10 (3.0 × 3.0) | 10 × 10 (3.0 × 3.0) | 10 × 10 (3.0 × 3.0) | 10 × 10 (3.0 × 3.0) | 10 × 10 (3.0 × 3.0) |
| Nominal discharge density, psig (kPa) | 25 (172) | 25 (172) | 25 (172) | 40 (276) | 40 (276) | 40 (276) | 40 (276) |
| Ignition location | Under one | Between four | Between two on same branchline | Under one | Between four | Between two on same branchline | See Note 1 |
| Test duration, minutes | 30 | 30 | 30 | 30 | 30 | 30 | 30 |

Note 1
Test scenario selected for this test is to be the most challenging based upon the results of previous tests.

The fire test conditions for a nominal K-25 ESFR sprinkler for use with a maximum ceiling height of 45 feet (13.7 m), as set forth in UL 1767, are listed in Table 51.5, reproduced below.

TABLE 51.5

Fire test conditions for nominal K-25.2 pendent ESFR sprinklers for use with a maximum ceiling height of 45 ft (13.7 m)

| | Test 1 | Test 2 | Test 3 | Test 4 | Test 5 | Test 6 | Test 7 | Test 8 |
|---|---|---|---|---|---|---|---|---|
| Storage Type | Double row rack | Double row rack | Double row rack | Double row rack | Double row rack | Double row rack | Double row rack | Double row rack |
| Commodity Type | Std. cartoned group A plastic | Std. cartoned group A plastic | Std. cartoned group A plastic | Std. cartoned group A plastic | Std. cartoned group A plastic | Std. cartoned group A plastic | Std. cartoned group A plastic | Std. cartoned group A plastic |
| Test Array | See FIG. 51.1 | See FIG. 51.2 | See FIG. 51.1 | See FIG. 51.4 | See FIG. 51.5 | See FIG. 51.3 | See Note 1 | See FIG. 51.2 |
| Nominal storage height, ft (m) | 20 (6.1) | 25 (7.6) | 20 (6.1) | 35 (10.7) | 40 (12.2) | 30 (9.1) | See Note 1 | 25 (7.6) |
| Nominal ceiling height, ft (m) | 30 (9.1) | 30 (9.1) | 30 (9.1) | 45 (13.7) | Adjusted to achieve sprinkler to deflector to commodity clearance | 45 (13.7) | 40 (12.2) | 45 (13.7) |
| Nominal clearance to deflector, ft (m) | 10 (3.0) | 5 (1.5) | 10 (3.0) | 10 (3.0) | 3 (0.9) | 15 (4.6) | See Note 1 | 20 (6.1) |
| Sprinkler temperature rating | Minimum temperature rating | Maximum temperature rating | Minimum temperature rating | Minimum temperature rating | Minimum temperature rating | Minimum temperature rating | See Note 1 | See Note 1 |
| Nominal deflector to ceiling distance, in (cm) | 14 (35.6) | Maximum specified by manufacturer | Maximum specified by manufacturer | 14 (35.6) | Maximum specified by manufacturer | Maximum specified by manufacturer | See Note 1 | See Note 1 |

TABLE 51.5-continued

Fire test conditions for nominal K-25.2 pendent ESFR sprinklers for use with a maximum ceiling height of 45 ft (13.7 m)

| | Test 1 | Test 2 | Test 3 | Test 4 | Test 5 | Test 6 | Test 7 | Test 8 |
|---|---|---|---|---|---|---|---|---|
| Sprinkler spacing, ft × ft (m × m) | 10 × 10 (3.0 × 3.0) | 10 × 10 (3.0 × 3.0) | 10 × 10 (3.0 × 3.0) | 10 × 10 (3.0 × 3.0) | 10 × 10 (3.0 × 3.0) | 10 × 10 (3.0 × 3.0) | 10 × 10 (3.0 × 3.0) | 10 × 10 (3.0 × 3.0) |
| Nominal discharge density, psig (kPa) | 15 (103) | 15 (103) | 15 (103) | 40 (276) | 40 (276) | 40 (276) | 25 (172) | 40 (276) |
| Ignition location | Under one | Between four | Between two on same branchline | Under one | Between four | Between two on same branchline | See Note 1 | See Note 1 |
| Test duration, minutes | 30 | 30 | 30 | 30 | 30 | 30 | 30 | 30 |

Note 1
Test scenario selected for this test is to be the most challenging based upon the results of previous tests.

When fire protection sprinklers are located in an area in which the fire protection sprinklers are susceptible to physical damage, sprinkler guards may be mounted to the fire protection sprinklers. Sprinkler guards known in the art may be mounted to a fire protection sprinkler prior to installation of the fire protection sprinkler in an occupancy, or they may be mounted to the fire protection sprinkler after installation.

For example, U.S. Pat. No. 5,893,418 (Ponte) teaches a sprinkler guard having U-shaped wire members arranged uniformly about a sprinkler axis, each joined at one end to a ring and at the other end to two opposed base plates. An opening allows the sprinkler guard to be mounted on a sprinkler head, and two tabs project inwardly toward a plane extending through the sprinkler axis between the base plates. In addition, two downwardly projecting portions of the base plates have outer surfaces that extend parallel to the two tabs. After the sprinkler guard is mounted to the sprinkler head, two wire clips that are pivotally supported on a wire member engage with a clip receiving portion on an adjacent wire member of an opposite section, so as to clamp two sections of the guard together.

U.S. Patent Application Publication No. 2014/0361100 (Hunsberger) discloses a sprinkler head protection arrangement having a base plate and a cover plate removably attached to the base plate using nuts and bolts, with each plate having a passageway for insertion of a sprinkler head. The cover plate has a protective cage formed of rigid links spaced apart circumferentially about a sprinkler head that is inserted into the passageway of the cover plate. At one end, the links are attached to the cover plate, and at the other end, the links are attached to a circumference of a top ring that is reinforced by a top bar. A second, lower ring may be provided between the cover plate and the top ring, with the links being attached about the circumference of the lower ring. Recesses or notches may be provided on the top and lower rings for placement of the links in manufacturing the cage. When the sprinkler head protection arrangement requires service, repair, or maintenance, the cover plate can be removed from the base plate, along with the protective cage.

ESFR sprinklers are very sensitive to spray pattern disruption. When known sprinkler guards, such as those disclosed in Ponte and Hunsberger, are mounted to ESFR sprinklers, the sprinkler guards obstruct the spray pattern of a fire protection fluid output by the ESFR sprinklers upon activation, and thus, the ESFR sprinklers may not meet the testing requirements, such as those set forth in UL 1767 and FM Approval Standard 2008, described above.

SUMMARY OF THE INVENTION

In view of these problems, our invention is directed to a sprinkler guard that can be mounted to a fire protection sprinkler before or after installation of the fire protection sprinkler in an occupancy. The sprinkler guard is structured so as to reduce or eliminate any obstruction to the spray pattern of the fire protection sprinkler. The sprinkler guards described herein are particularly adapted for use with ESFR fire protection sprinklers having K-factors of 22.4 gpm/(psi)$^{1/2}$ and 25.2 gpm/(psi)$^{1/2}$, such as the K22 and K25 ESFR fire protection sprinklers manufactured by The Reliable Automatic Sprinkler Co., Inc., of Liberty, South Carolina, United States.

In a first embodiment, a sprinkler guard that is mountable to a fire protection sprinkler comprises two or more plates centered relative to a central axis of the sprinkler guard, the two or more plates defining a plane that is perpendicular to the central axis. The two or more plates include a first plate having a first projection that extends from the first plate in an upward direction that is parallel to the central axis, one or more second projections that extend from the first projection of the first plate in a first lateral direction that is orthogonal to the central axis, and a lower surface facing a downward direction that is opposite to the upward direction. The two or more plates also include a second plate having a first projection that extends from the second plate in the upward direction, one or more second projections that extend from the first projection of the second plate in a second lateral direction that is opposite to the first lateral direction, and a lower surface facing the downward direction.

The sprinkler guard of the first embodiment further comprises a plurality of legs including a first leg having an upper end attached to the lower surface of the first plate, the upper end extending in a first inward radial direction that is orthogonal to and toward the central axis, a middle portion extending in the downward direction and having an indent, and a lower end extending in the first inward radial direction. A second leg has an upper end attached to the lower surface of the first plate, the upper end extending in a second inward radial direction that is orthogonal to and toward the central axis, a middle portion extending in the downward direction and having an indent, and a lower end extending in the second inward radial direction. A third leg has an upper end attached to the lower surface of the second plate, the upper end extending in a third inward radial direction that is orthogonal to and toward the central axis, and that is opposite to the first inward radial direction, a middle portion extending in the downward direction and having an indent, and a lower end extending in the third inward radial direction. A fourth leg has an upper end attached to the lower surface of the second plate, the upper end extending in a fourth inward radial direction that is opposite to the second inward radial direction, a middle portion extending in the downward direction and having an indent, and a lower end extending in the fourth inward radial direction.

The sprinkler guard of the first embodiment further comprises circular ring is attached to each of the lower ends of the first to fourth legs, and has a center that coincides with the central axis. The first to fourth legs are spaced apart about the circumference of the circular ring. Two or more swing arms include a first swing arm having a looped end that at least partly encircles the middle portion of the first leg and configured to sit in the indent of the middle portion of the first leg, a free end that is opposite to the looped end, and a bent portion, provided between the looped end and the free end, and configured to snap fit into the indent of the middle portion of the third leg. In addition, the two or more swing arms include a second swing arm having a looped end that at least partly encircles the middle portion of the second leg and configured to sit in the indent of the middle portion of the second leg, a free end that is opposite to the looped end, and a bent portion, provided between the looped end and the free end, and configured to snap fit into the indent of the middle portion of the fourth leg. The sprinkler guard further comprises a cross bar that is attached to a lower surface of the circular ring, the cross bar extending along a diameter of the circular ring and along an axis that is orthogonal to the central axis and parallel to the first and second lateral directions.

In a second embodiment, a sprinkler guard that is mountable to a fire protection sprinkler comprises two or more plates centered relative to a central axis of the sprinkler guard, the two or more plates defining a plane that is perpendicular to the central axis. The two or more plates include a first plate having a first projection that extends from the first plate in an upward direction that is parallel to the central axis, one or more second projections that extend from the first projection of the first plate in a first lateral direction that is orthogonal to the central axis, and a lower surface facing a downward direction that is opposite to the upward direction. The two or more plates also include a second plate having a first projection that extends from the second plate in the upward direction, one or more second projections that extend from the first projection of the second plate in a second lateral direction that is opposite to the first lateral direction, and a lower surface facing the downward direction.

The sprinkler guard further comprises a plurality of legs including first leg having an upper end attached to the lower surface of the first plate, the upper end extending in a first inward radial direction that is orthogonal to and toward the central axis, a middle portion extending in the downward direction and having an indent, and a lower end extending in the first inward radial direction. A second leg has an upper end attached to the lower surface of the first plate, the upper end extending in a second inward radial direction that is orthogonal to and toward the central axis, a middle portion extending in the downward direction and having an indent, and a lower end extending in the second inward radial direction. A third leg has an upper end attached to the lower surface of the second plate, the upper end extending in a third inward radial direction that is opposite to the first inward radial direction, a middle portion extending in the downward direction and having an indent, and a lower end extending in the third inward radial direction. In addition, a fourth leg has an upper end attached to the lower surface of the second plate, the upper end extending in a fourth inward radial direction that is opposite to the second inward radial direction, a middle portion extending in the downward direction and having an indent, and a lower end extending in the fourth inward radial direction.

The sprinkler guard of the second embodiment further comprises a circular ring that is attached to each of the lower ends of the first to fourth legs, a center of the circular ring coinciding with the central axis, and the first to fourth legs being spaced apart about the circumference of the circular ring. Two or more swing arms include a first swing arm having a looped end that at least partly encircles the middle portion of the first leg and configured to sit in the indent of the middle portion of the first leg, a free end that is opposite to the looped end, and a bent portion, provided between the looped end and the free end, and configured to snap fit into the indent of the middle portion of the third leg. The two or more swing arms further include a second swing arm having a looped end that at least partly encircles the middle portion of the second leg and configured to sit in the indent of the middle portion of the second leg, a free end that is opposite to the looped end, and a bent portion, provided between the looped end and the free end, and configured to snap fit into the indent of the middle portion of the fourth leg. In addition, a cross bar is attached to the circular ring, and extends along a diameter of the circular ring and along an axis that is perpendicular to the central axis and perpendicular to the first and second lateral directions.

DETAILED DESCRIPTION

A sprinkler guard according to the first embodiment will be described with reference to FIGS. 1 to 8.

Figure 1:
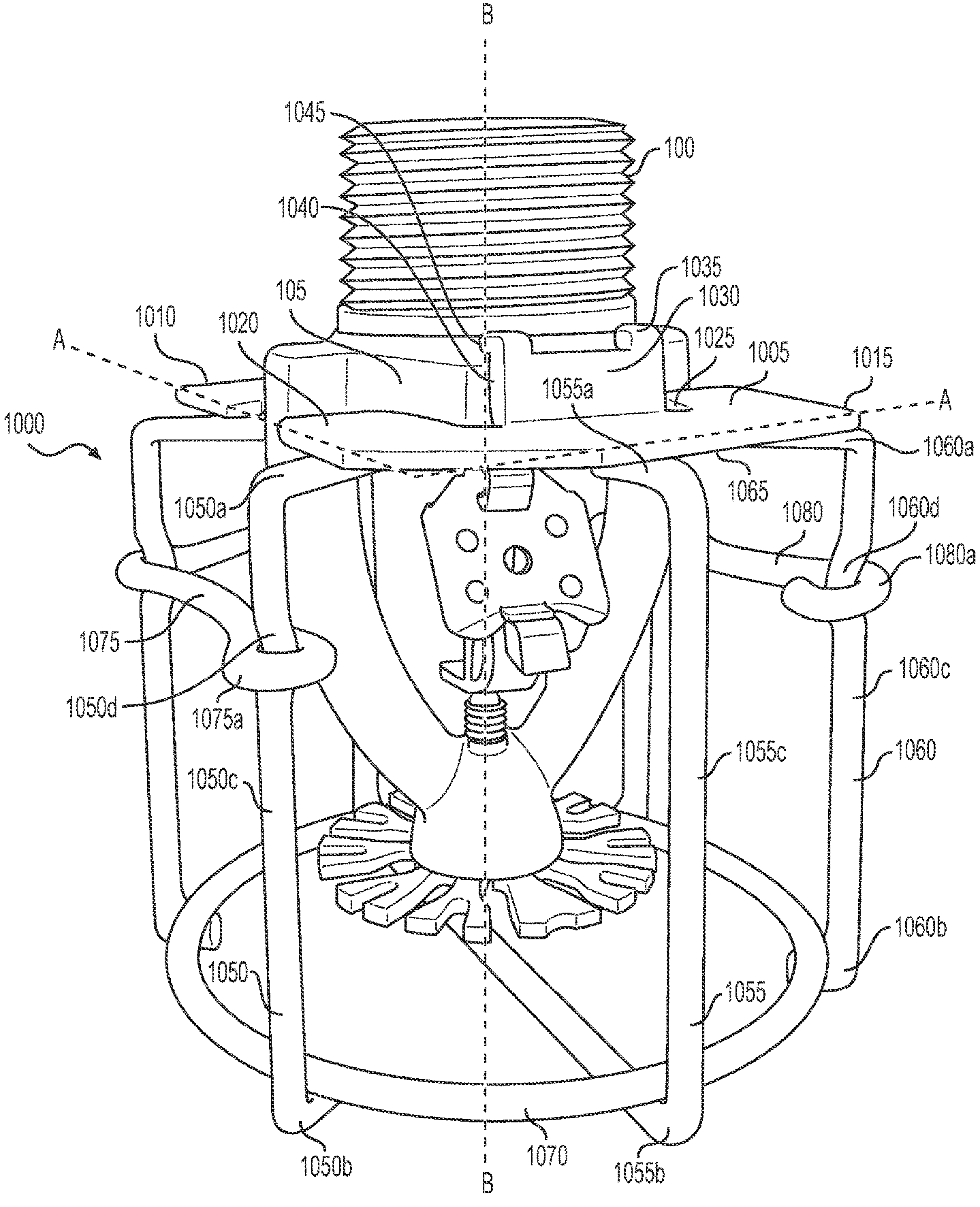
FIG. 1 is an isometric view of a sprinkler guard, mounted to a fire protection sprinkler, in a latched state, according to a first embodiment of the invention.

As shown in FIG. 1, a sprinkler guard 1000 can be mounted to a fire protection sprinkler 100 to protect the fire protection sprinkler 100 from physical damage. The sprinkler guard 1000 includes a first plate 1005 and a second plate 1010 that generally extend in a plane A-A that is perpendicular a central axis B of the sprinkler guard 1000 (the central axis B coincides with a central axis of the fire protection sprinkler 100). The first plate 1005 and the second plate 1010 mirror each other with respect to the central axis B. The first plate 1005 has an outer peripheral edge 1015 and an inner peripheral edge 1020 that faces the central axis B. The inner peripheral edge 1020 has a recessed portion 1025 that can receive a portion of a hexagonal flange 105 of the fire protection sprinkler 100, as shown in FIG. 1.

A first projection 1030 of the first plate 1005 extends out of the plane A-A, in an upward direction in FIG. 1 that is parallel to the central axis B. One or more second projections 1035 extend from the first projection 1030 in a direction that is perpendicular to the central axis B and toward the second plate 1010. When the sprinkler guard 1000 is mounted to the fire protection sprinkler 100, an inner surface 1040 of the first projection 1030 and a lower surface 1045 of each of the one or more second projections 1035 contact at least two surfaces of the hexagonal flange 105 of the fire protection sprinkler 100. In the embodiment shown in FIG. 1, the first plate 1005 of the sprinkler guard 1000 has two second projections 1035, although it is within the scope of our invention to have any number of second projections 1035.

First to third legs 1050, 1055, and 1060 are attached to attached to a lower surface 1065 of the first plate 1005, as shown in FIG. 1. Each of the first to third legs 1050, 1055, 1060 has an upper end 1050*a*, 1055*a*, 1060*a*, respectively, that is attached, for example, by welding, to the lower surface 1065 of the first plate 1005. The upper ends 1050*a*. 1055*a*. 1060*a* of the first to third legs 1050, 1055, 1060 extend in first to third inward radial directions, respectively, that are perpendicular to and toward the central axis B. Each of the first to third legs 1050, 1055, 1060 also has a lower end 1050*b*, 1055*b*, 1060*b*, respectively. The lower ends 1050*b*, 1055*b*, and 1060*b* of the first to third legs 1050, 1055, and 1060, respectively, are attached to a circular ring 1070. Each of the first to third legs 1050, 1055, 1060 also includes a middle portion 1050*c*. 1055*c*. 1060*c* that extends from the upper end 1050*a*, 1055*a*, 1060*a* to the lower end 1050*b*, 1055*b*, 1060*b*, respectively, and is parallel to the central axis B. The center of the ring 1070 coincides with the central axis B, and the first to third legs 1050, 1055, 1060 are spaced apart around one half of the ring 1070 with respect to the central axis B. In the first embodiment, as shown in FIG. 1, the first leg 1050 and the third leg 1060 are equally spaced from the second leg 1055. In addition, the first leg 1050 and the second leg 1060 have indented portions 1050*d*. 1060*d*, respectively, that can receive lopped portions 1075*a*. 1080*a* of swing arms 1075, 1080, described below.

A first swing arm 1075 is rotatably attached to the first leg 1050 by a looped portion 1075*a* that partly or entirely encircles the first leg 1050. The looped portion 1075*a* is received in the indented portion 1050*d* of the first leg 1050 when the sprinkler guard 1000 is in a latched state, as shown in FIG. 1. The swing arm 1075 is free to move along the middle portion 1050*c* of the first leg 1050 when the sprinkler guard 1000 is in an unlatched state. A second swing arm 1080 is rotatably attached to the third leg 1060 by a looped portion 1080*a* that partly or entirely encircles the third leg 1060. The looped portion 1080*a* is received in the indented portion 1060*d* of the third leg 1060 when the sprinkler guard 1000 is in the latched state, as shown in FIG. 1. The swing arm 1080 is free to move along the middle portion 1060*c* of the third leg 1060 when the sprinkler guard 1000 is in the unlatched state.

Figure 2:
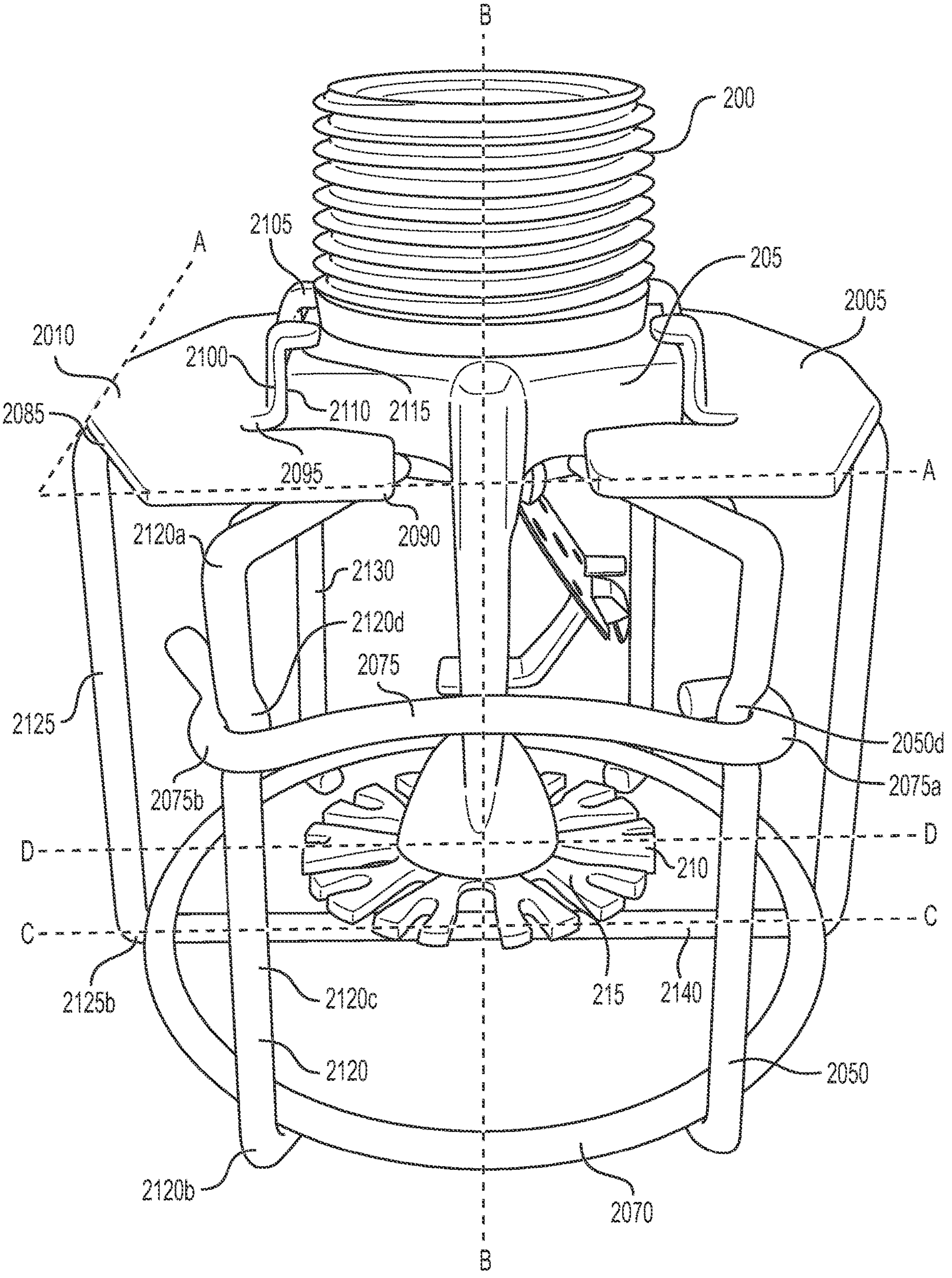
FIG. 2 is an isometric view of the sprinkler guard, mounted to the fire protection sprinkler, in the latched state, according to the first embodiment of the invention.

As shown in FIG. 2, with respect to the central axis B of the fire protection sprinkler 200, the shape of the second plate 2010 mirrors the shape of the first plate 2005. The second plate 2010 of the sprinkler guard 2000 has an outer peripheral edge 2085 and an inner peripheral edge 2090 that faces the central axis B. The outer peripheral edge 2085 of the second plate 2010 and the outer peripheral edge 2015 of the first plate 2005, taken together, form an octagon, although the outer peripheral edges 2085, 2015 are not limited to this shape. The outer peripheral edges 2085, 2015 may form other shapes, such as a rectangle, a square, a circle, and an oval, among others.

The inner peripheral edge 2090 of the second plate 2010 has a recessed portion 2095 that can receive a portion of the hexagonal flange 205 of the fire protection sprinkler 200, as shown in FIG. 2. A first projection 2100 of the second plate 2010 extends out of the plane A-A, in an upward direction in FIG. 2 that is parallel to the central axis B. One or more second projections 2105 extend from the first projection 2100 in a direction that is perpendicular to the central axis B. When the sprinkler guard 2000 is mounted to the fire protection sprinkler 200, an inner surface 2110 of the first projection 2100 and a lower surface 2115 of each of the one or more second projections 2105 contact at least two surfaces of the hexagonal flange 205 of the fire protection sprinkler 200. In the embodiment shown in FIG. 2, the sprinkler guard 2000 has two second projections 2105, although it is within the scope of our invention to have any number of second projections 2105.

Fourth to sixth legs 2120, 2125, and 2130 are attached to a lower surface 2135 of the second plate 2010. The structure of the fourth to sixth legs 2120, 2125, and 2130 is the same as that of the first to third legs 1050, 1055, 1060, respectively, as described with reference to FIG. 1. That is, each of the fourth to sixth legs 2120, 2125, 2130 has an upper end 2120*a*, 2125*a*, 2130*a*, respectively, that is attached, for example, by welding, to the lower surface 2135 of the second plate 2010. The upper ends 2120*a*. 2125*a*, 2130*a* extend in fourth to sixth inward radial directions, respectively, that are perpendicular to and toward the central axis B. In this embodiment, the fourth inward radial direction is opposite to the third inward radial direction, the fifth inward radial direction is opposite to the second inward radial direction, and the sixth inward radial direction is opposite to the first inward radial direction.

Each of the fourth to sixth legs 2120, 2125, 2130 also has a lower end 2120*b*, 2125*b*, 2130*b*, respectively. The lower ends 2120*b*, 2125*b*, 2130*b* are attached to the circular ring 2070 (the circular ring 2070 shown in FIG. 2 is the same as the circular ring 1070 shown in FIG. 1). Each of the fourth to sixth legs 2120, 2125, 2130 also includes a middle portion 2120*c*, 2125*c*, 2130*c*, respectively, that extends between the upper end 2120*a*, 2125*a*, 2130*a* and the lower end 2120*b*, 2125*b*, 2130*b*, respectively, and that extends in a direction that is parallel to the central axis B. The center of the ring 2070 coincides with the central axis B, and the fourth to sixth legs 2120, 2125, and 2130 are spaced apart around another half of the ring 2070 with respect to the central axis B. In the embodiment shown in FIG. 2, the fourth leg 2120 and the sixth leg 2130 are equally spaced from the fifth leg 2125. In addition, the fourth leg 2120 and the sixth leg 2130 have indented portions 2120*d*. 2130*d*, respectively, that can receive the first swing arm 2075 (the first swing arm 2075 is the same as the first swing arm 1075 shown in FIG. 1) and the second swing arm 2080 (the second swing arm 2080 is the same as the second swing arm 1080 shown in FIG. 1), respectively, when the sprinkler guard 2000 is in the latched state.

At an end that is opposite to the looped ends 2075*a*. 2080*a*, each of the first swing arm 2075 and the second swing arm 2080 has a free end 2075*c*. 2080*c*, respectively. Between the looped portions 2075*a*. 2080*a* and the free ends 2075*c*, 2080*c*, each of the first swing arm 2075 and the second swing arm 2080 has a bent portion 2075*b*, 2080*b*, respectively. The bent portions 2075*b*, 2080*b* partly encircle the fourth leg 2120 and the sixth leg 2130, respectively. The free ends 2075*c*, 2080*c* allow for ease of latching and unlatching the swing arms 2075, 2085. When the sprinkler guard 2000 is in the latched state, as shown in FIG. 2, the looped end 2075*a* of the first swing arm 2075 is positioned in the indented portion 2050*d* of the first leg 2050 attached to the first plate 2005, and the looped end 2080*a* of the second swing arm 2080 is positioned in the indented portion 2060*d* of the third leg 2060 attached to the first plate 2005. In addition, when the sprinkler guard 2000 is in the latched state, the bent portion 2075*b* of the first swing arm 2075 is positioned in the indented portion 2120*d* of the fourth leg 2120 attached to the second plate 2010, and the bent portion 2080*b* of the second swing arm 2080 is positioned in the indented portion 2130*d* of the sixth leg 2130 attached to the second plate 2010. The bent portions 2075*b*, 2080*b* may be snap fit into the indented portions 2120*d*. 2130*d*, respectively.

In the first embodiment, as shown in FIG. 2, the lower end 2055*b* of the second leg 2055 attached to the first plate 2005 and the lower end 2125*b* of the fifth leg 2125 attached to the second plate 2010 are connected with a cross bar 2140. The cross bar 2140 extends diametrically across the circular ring 2070, along an axis defined by the second inward radial direction and the fifth inward radial direction. In the embodiment shown in FIG. 2, the circular ring 2070 is attached to an upper surface of the lower ends 2055*b*, 2125*b* of the second leg 2055 and the fifth leg 2125. When the sprinkler guard 2000 is mounted on the fire protection sprinkler 200, the cross bar 2140 aligns with tabs 210 of a deflector 215 of the fire protection sprinkler 200. That is, if the tabs 210 of the deflector 215 define an axis D, the cross bar 2140 extends along an axis C that is perpendicular to the central axis B, and parallel to the plane A-A and to the axis D.

Figure 3:
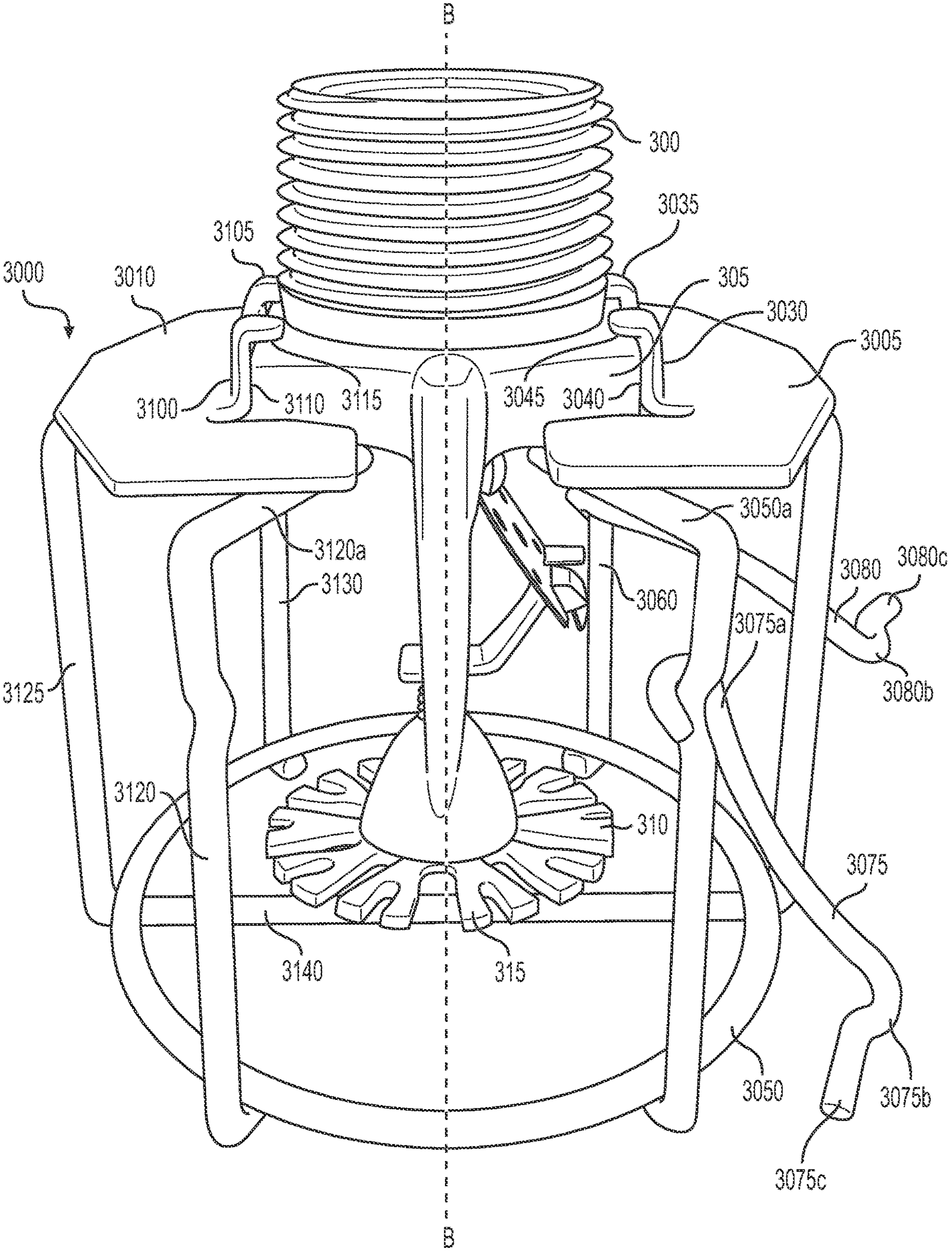
FIG. 3 is an isometric view of the sprinkler guard, mounted to the fire protection sprinkler, in an unlatched state, according to the first embodiment of the invention.

When the sprinkler guard 3000 is in the unlatched state, as shown in FIG. 3, the looped end 3075*a* of the first swing arm 3075 remains rotatably attached to the first leg 3050 attached to the first plate 3005. Similarly, the looped end 3080*a* of the second swing arm 3080 remains rotatably attached to the third leg 3060 attached to the first plate 3005.

Figure 4:
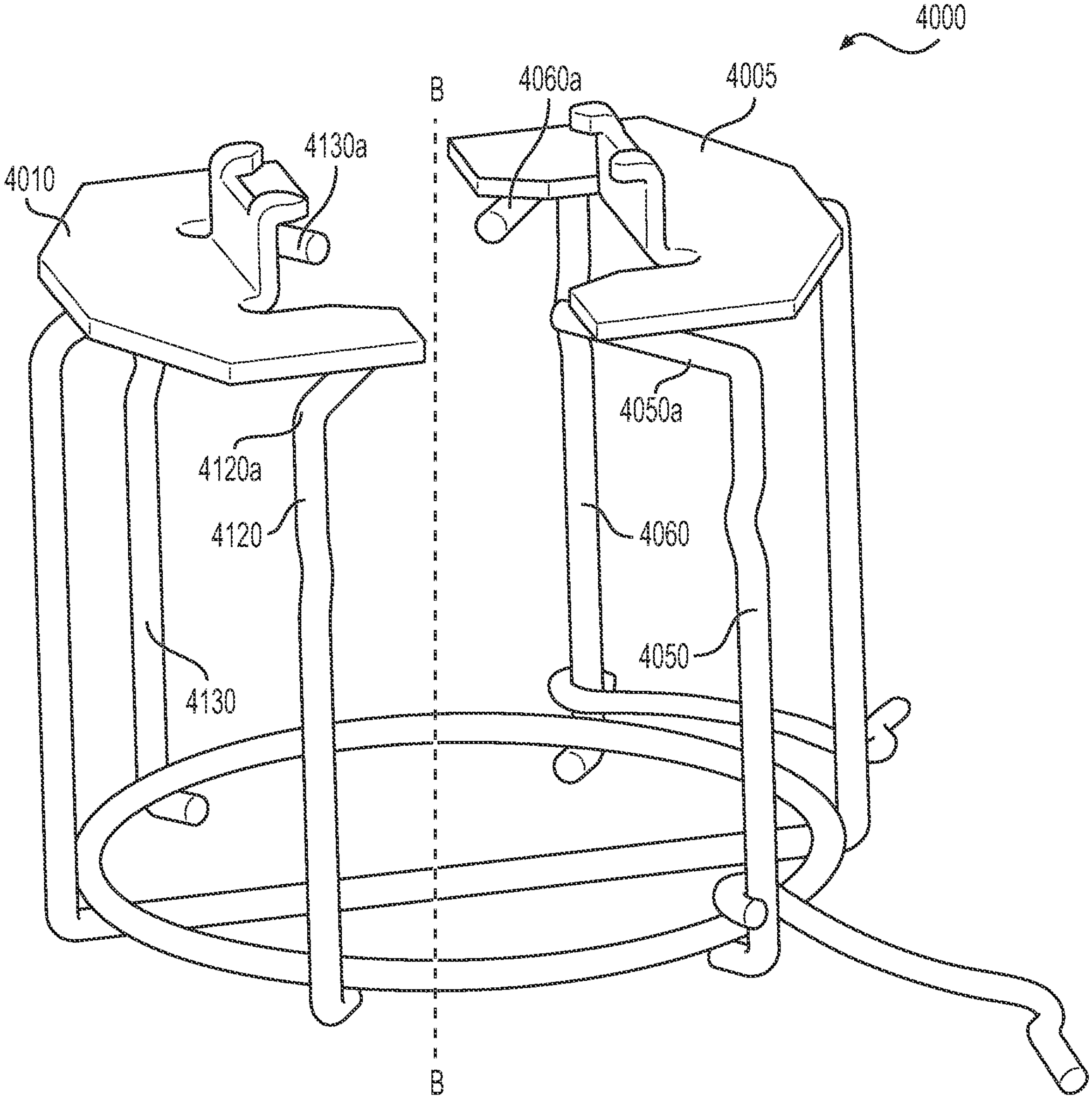
FIG. 4 is an isometric view of the sprinkler guard in the unlatched state, according to the first embodiment of the invention.

As shown in FIG. 4, the upper ends 4050*a*, 4060*a*, 4120*a*, and 4130*a* of the first leg 4050, the third leg 4060, the fourth leg 4020, and the sixth leg 4030, respectively, extend beyond the first plate 4005 and the second plate 4010 towards the central sprinkler axis B. With reference to FIG. 3, when the sprinkler guard 3000 is mounted to the fire protection sprinkler 300, the hexagonal flange 305 is thus sandwiched between the lower surfaces 3045 of the one or more second projections 3035 and the inner surface 3040 of the first projection 3030 of the first plate 3005, the lower surface 3115 of the one or more second projections 3105 and the inner surface 3110 of the first projection 3100 of the second plate 3010, and the upper ends 3050*a*, 3060*a*, 3120*a*, and 3130*a* of the first leg 3050, the third leg 3060, the fourth leg 3020, and the sixth leg 3030, respectively.

Figure 5:
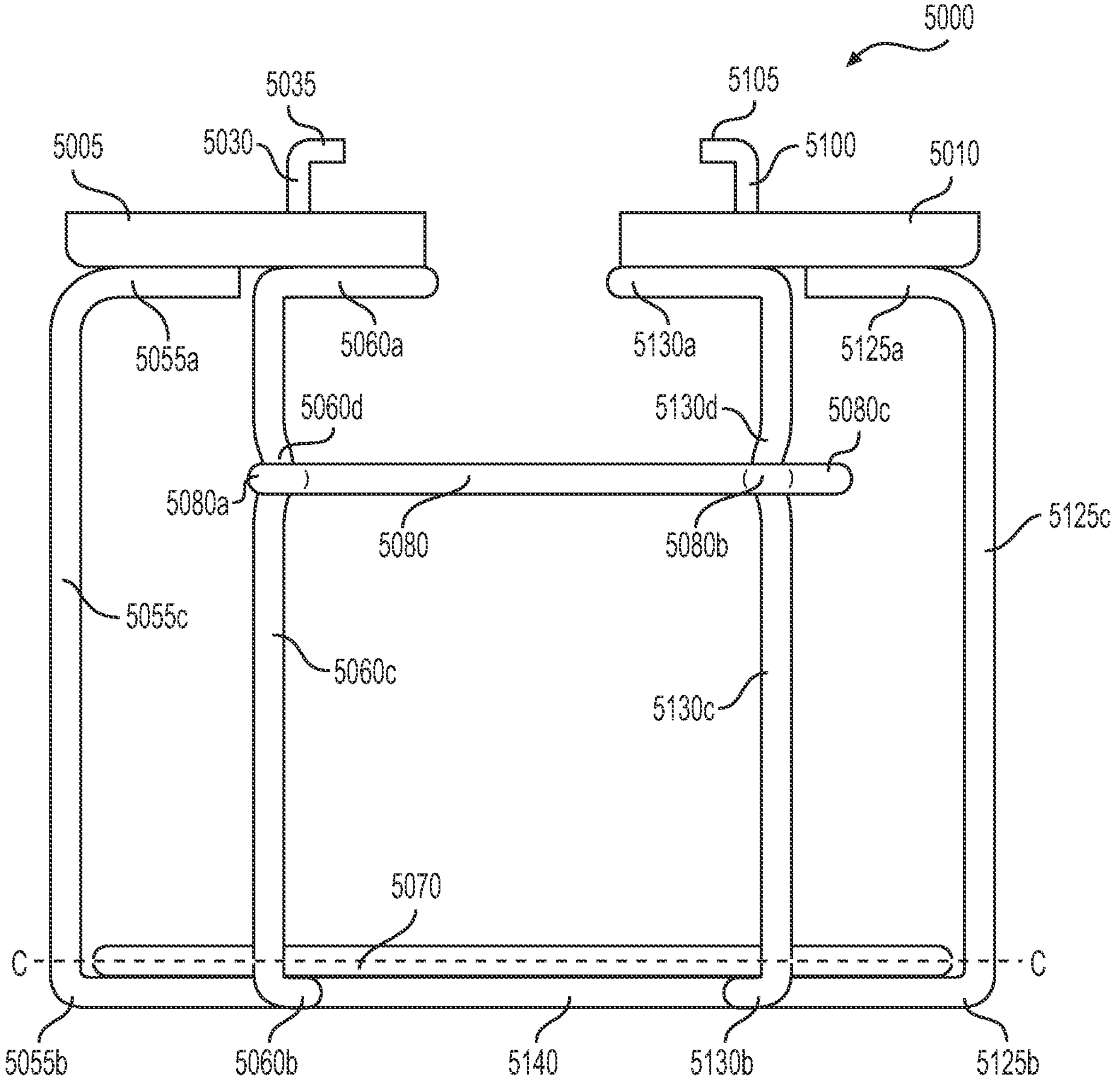
FIG. 5 is a side view of the sprinkler guard in the latched state, according to the first embodiment of the invention.
Figure 6:
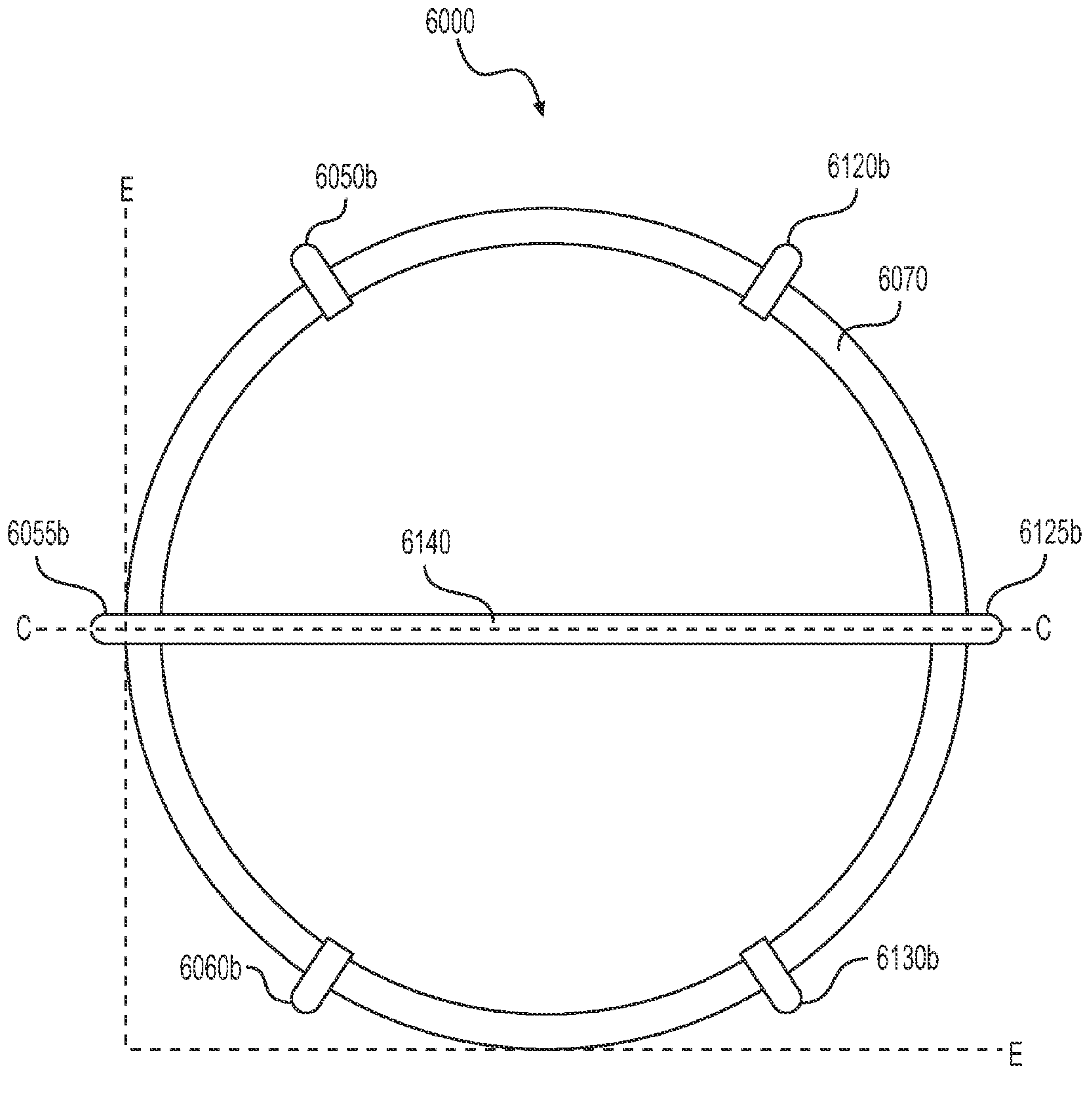
FIG. 6 is a bottom view of a lower portion of the sprinkler guard according to the first embodiment of the invention.

FIG. 5 is a side view of the sprinkler guard 5000 of the first embodiment. The circular ring 5070 may be attached to an upper surface of each of the lower ends 5050*b*, 5055*b*, 5060*b*, 5120*b*, 5125*b*, and 5130*b* of the first to sixth legs 5050, 5055, 5060, 5120, 5125, and 5130, respectively. With reference to FIG. 6, the cross bar 6140 extends along the axis C between the lower end 6055*b* of the second leg 6055 and the lower end 6125*b* of the fifth leg 6125, within a plane E-E defined by the ring 6070.

Figure 7:
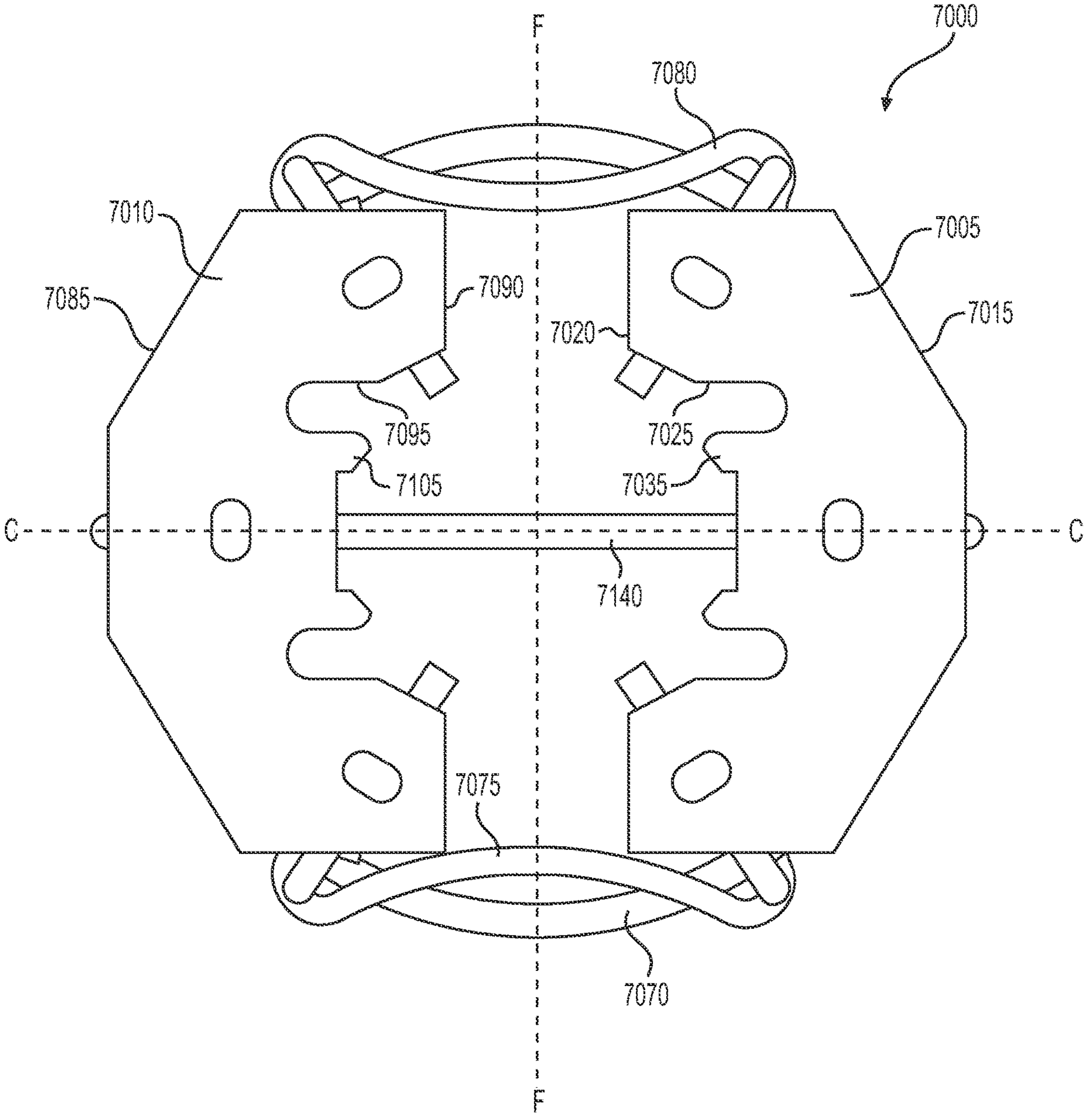
FIG. 7 is a top view of the sprinkler guard in the latched state, according to the first embodiment of the invention.

FIG. 7 shows a top view of the sprinkler guard 7000 in the first embodiment. The first plate 7005 and the second plate 7010 mirror each other with respect to an axis F that is perpendicular to the axis C. The intersection of the axis F and the axis C coincides with the central axis B. In FIG. 7, the sprinkler guard 7000 is in the latched state, with the swing arms 7075, 7080 being snap fit into the fourth leg 2120 and the sixth leg 2130, respectively, to pull the first plate 7005 and the second leg 7010 toward each other.

Figure 8:
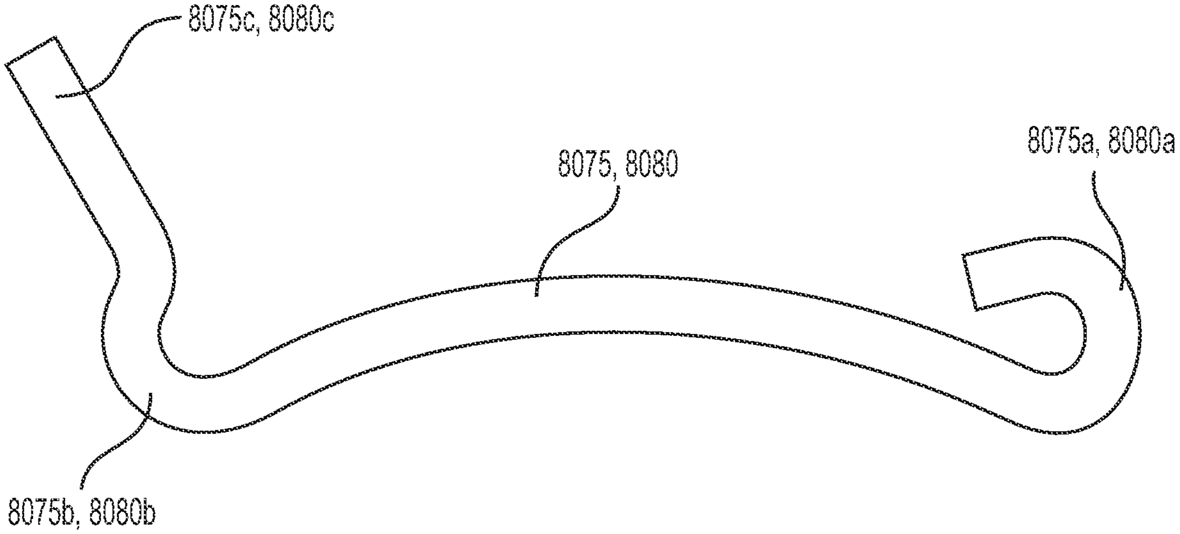
FIG. 8 is a view of a swing arm of the sprinkler guard according to the first embodiment of the invention.

FIG. 8 shows a side view of one of the swings arms 8075, 8080 in the first embodiment. The swing arms 8075, 8080 include the looped ends 8075*a*, 8080*a* formed as hooks, such that, when the first leg 8050 and the third leg 8060 are inserted through the looped ends 8075*a*, 8080*a*, respectively, the swing arms 8075, 8080 remain rotatably attached to the first and third legs 8050. 8060, respectively.

The sprinkler guard 1000 of the first embodiment is adapted for use with an ESFR fire protection sprinkler having a K-factor of 25.2 gpm/(psi)$^{1/2}$ (K-25 ESFR sprinkler), manufactured by The Reliable Automatic Sprinkler Co., Inc. The K-25 ESFR sprinkler has the hexagonal flange 105, shown in FIG. 1. When the sprinkler guard 1000 is mounted to the K-25 ESFR sprinkler 100, the inner surface 1040 of the first projection 1030 and the lower surface 1045 of each of the one or more second projections 1035 of the first plate, the inner surface 1110 of the first projection 1100 and the lower surface 1115 of each of the one or more second projections 1105 of the second plate, and the upper ends 1050*a*, 1060*a*, 1120*a*, 1130*a* of the first, third, fourth, and sixth legs, respectively, contact the hexagonal flange 105 of the fire protection sprinkler 100. When the swing arms 1075, 1080 are snap fit into the indented portions 1120*d*. 1130*d* of the fourth and sixth legs 1120, 1130, respectively, the sprinkler guard 1000 is firmly mounted to the K-25 ESFR sprinkler 100. In addition, the deflector 115 of the K-25 ESFR sprinkler 100 has the tabs 110 that extend along the axis C. Positioning of the cross bar 1140 along the axis C reduces the interference of the sprinkler guard 1000 with the spray pattern that is formed by the deflector 115 of the K-25 ESFR sprinkler 100. Thus, the sprinkler guard 1000 according to the first embodiment can be used to protect a K-25 ESFR sprinkler from physical damage while ensuring that the K-25 ESFR sprinkler meets the testing requirements set forth in the relevant standards discussed herein, including UL 1767 and FM Approval Standard 2008.

Further, the sprinkler guard 1000 according to our invention can be easily and securely mounted to the fire protection sprinkler 100 by virtue of the rotatable swing arms 1075, 1080. That is, during installation of the sprinkler guard 1000, after slipping the sprinkler guard 1000 onto the fire protection sprinkler 100, the swing arms 1075, 1080 can be moved so that the looped ends 1075*a*, 1080*a* are positioned in the indented portions 1050*d*. 1060*d* of the first leg 1050 and the third leg 1060, respectively, and the bent portions 1075*b*, 1080*b* can be snap fit onto the indented portions 1120*d*. 1130*d* of the fourth leg 1120 and the sixth leg 1130, respectively. By snap fitting the swings arms 1075, 1080 in this manner, the first plate 1005 and the second plate 1010 are urged toward each other, and the above-noted portions of the sprinkler guard 1000 firmly grip the hexagonal flange 105 of the fire protection sprinkler 100.

As a method of manufacturing the sprinkler guard 1000 of the first embodiment, the first plate 1005 may be formed of a relatively thin metal plate having a thickness of approximately 0.0750 inch (1.91 mm). The second plate 2010 may also be formed of a relatively thin metal plate having a thickness of approximately 0.0750 inch (1.91 mm).

Although the dimensions may vary, each of the first plate 1005 and the second plate 1010 may, for example, have an overall (i.e., total) length of 2.25 inches (57.15 mm), the length being measured along the axis F in FIG. 7, and an overall (i.e., total) width of 1.125 inches (28.58 mm), the width being measured along the axis C in FIG. 7. The plates may have rolled edges for increasing the stiffness thereof.

The recessed portions 1025, 1095 of the first plate 1005 and the second plate 1010, respectively, may have a depth of 0.5 inch (12.7 mm) from the inner peripheral edges 1020, 1090 of the first plate 1005 and the second plate 1010, respectively. The first projections 1030, 1100 of the first plate 1005 and the second plate 1010, respectively, may be formed by bending the corresponding portion of the first plate 1005 and the second plate 1010 at an angle of approximately 90° from the plane A-A defined by the first plate 1005 and the second plate 1010. Similarly, the second projections 1035, 1110 of the first plate 1005 and the second plate 101, respectively, may be formed by bending the corresponding portion of the first plate 1005 and the second plate 1010 at an angle of approximately 90° from the first projections 1030, 1100, so that the second projections 1035, 1110 extend in a direction that is parallel to the plane A-A.

The first to sixth legs 1050, 1055, 1060, 1120, 1125, 1130 may be formed by rolling and bending of the metal, and may have a circular cross-sectional diameter of 0.125 inch (3.18 mm). A total length of each of the first, third, fourth, and sixth legs 1050, 1060, 1120, 1130 may be, for example. 3.75 inches (95.25 mm), and a total length of the second and fifth legs 1055, 1125 may be, for example, 3.25 inches (82.55 mm). The upper ends 1050*a*, 1055*a*, 1060*a*, 1120*a*, 1125*a*, and 1030*a* of the first to sixth legs 1050, 1055, 1060, 1120, 1125, and 1130, respectively, may be formed by bending an end of the first to sixth legs 1050, 1055, 1060, 1120, 1125, and 1130 to form an angle of approximately 90°. The upper ends 1050*a*, 1060*a*, 1120*a*, and 1130*a* of the first, third, fourth, and sixth legs 1050, 1060, 1120, and 1130, respectively, measure approximately 1 inch (25.4 mm) in length, and the upper ends 1055*a*, 1125*a* of the second and fifth legs 1055, 1125, respectively, measure approximately 0.5 inch (12.7 mm). The lower ends 1050*b*, 1055*b*, 1060*b*, 1120*b*, 1125*b*, and 1030*b* of the first to sixth legs 1050, 1055, 1060, 1120, 1125, and 1130, respectively, are also formed by bending another end of the first to sixth legs 1050, 1055, 1060, 1120, 1125, and 1030 to form an angle of approximately 90°. Each of the lower ends 1050*b*, 1055*b*, 1060*b*, 1120*b*, 1125*b*, and 1030*b* of the first to sixth legs 1050, 1055, 1060, 1120, 1125, and 1130 measures approximately 0.25 inch (6.35 mm) along the respective first to sixth inward radial direction.

The swing arms 1075, 1080 may also be formed by rolling and bending of the metal, and may have a circular cross-sectional diameter of 0.125 inch (3.18 mm). The looped ends 1075*a*, 1080*a* of the swing arms 1075, 1080, respectively, may be formed by bending one end of the swing arm 1075, 1080 to form a loop. The loop may be partly open, as shown in FIG. 8, although it is within the scope of our invention to form a fully enclosed loop. For example, a fully enclosed loop may be formed by bending the end of the swing arm 1075, 1080 into a loop, and welding the end of the loop to the swing arm 1075, 1080.

The circular ring 1070 may also be formed by rolling and bending of the metal, and may have a circular cross-sectional diameter of 0.0625 inch (1.59 mm). The circular ring 1070 may be closed by welding. The diameter of the circular ring 1070 in the first embodiment is 3 inches (76.2 mm). In comparison to a diameter of the deflector 115, the diameter of the circular ring 1070 is approximately one and one half to two times larger, which ensures that the sprinkler guard 1000 is compact yet large enough so as not to interfere with the spray pattern of the fire protection sprinkler 100.

The lower ends 1050*b*, 1055*b*, 1060*b*, 1020*b*, 1025*b*, and 1030*b* of the first to sixth legs 1050, 1055, 1060, 1120, 1125, and 1130 may be attached to the circular ring 1070 at upper surfaces thereof, as shown in FIG. 1, by welding. In the first embodiment, the second and fifth legs 1055, 1025 may be formed integrally with the cross bar 1140, and thus, the circular ring 1070 is also welded to an upper surface of the cross bar 1140. The second and fifth legs 1055, 1125 are inserted into the looped ends 1075*a*, 1080*a* of the swing arms. The upper ends 1050*a*, 1055*a*, and 1060*a* of the first to third legs 1050, 1055, and 1060, respectively, are attached to the lower surface 1065 of the first plate 1005 by welding. Similarly, the upper ends 1120*a*, 1125*a*, and 1030*a* of the fourth to sixth legs 1120, 1125, and 1130, respectively, are attached to the lower surface 1115 of the second plate 1010.

Although the sprinkler guard 1000 may be manufactured using rolling, bending, and welding, as described above, other manufacturing processes may be used to form and to assemble the sprinkler guard 1000.

Figure 9:
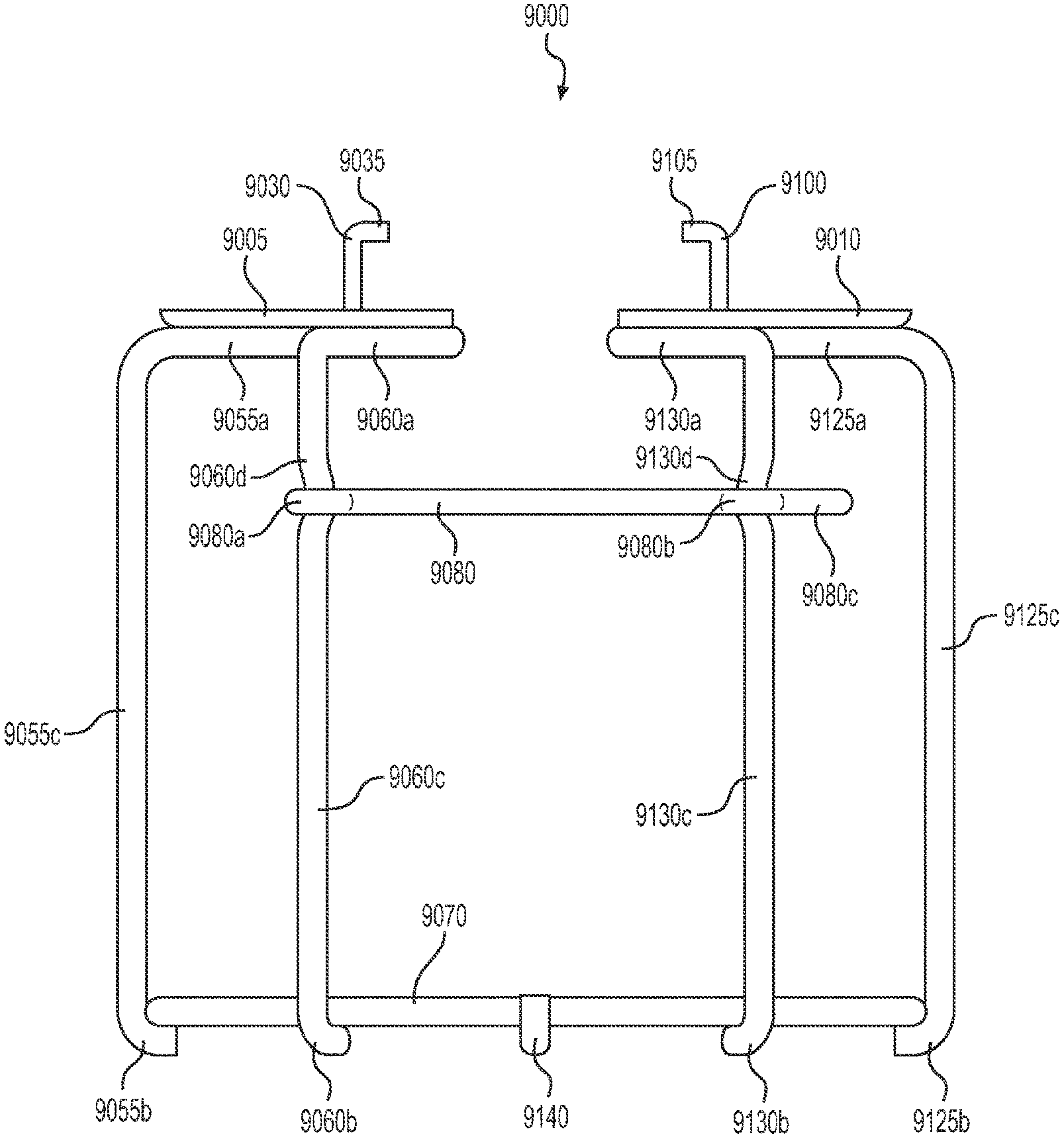
FIG. 9 is a side view of a sprinkler guard in a latched state, according to a second embodiment of the invention.

A sprinkler guard according to a second embodiment will be described with reference to FIGS. 9-11. The sprinkler guard 9000 of the second embodiment is generally similar to the sprinkler guard 1000 of the first embodiment, with the exception of the relative orientation of the cross bar 9140. Accordingly, descriptions of those elements of the first embodiment that are the same in the second embodiment are omitted.

Figure 10:
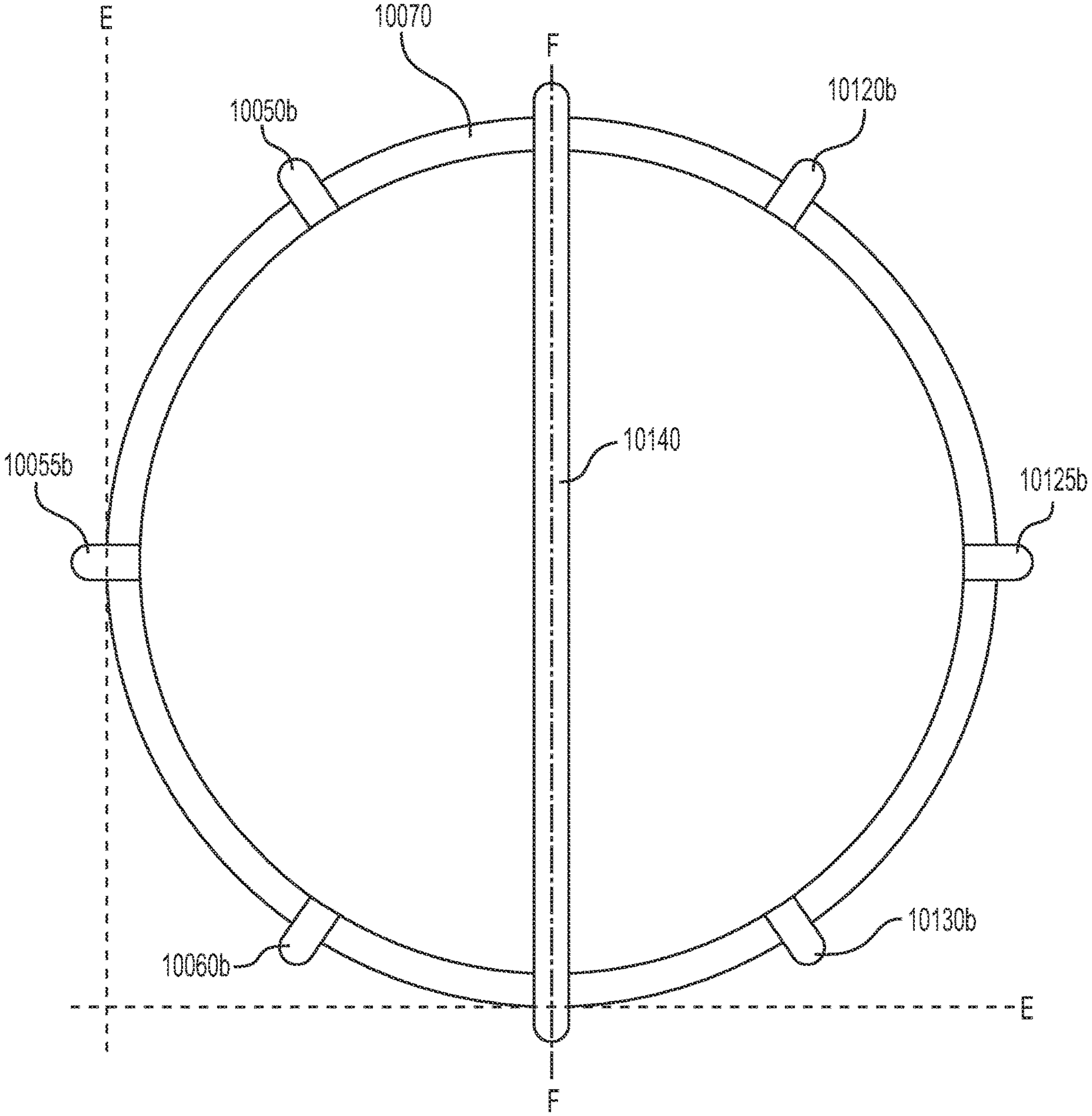
FIG. 10 is a bottom view of a lower portion of the sprinkler guard according to the second embodiment of the invention.
Figure 11:
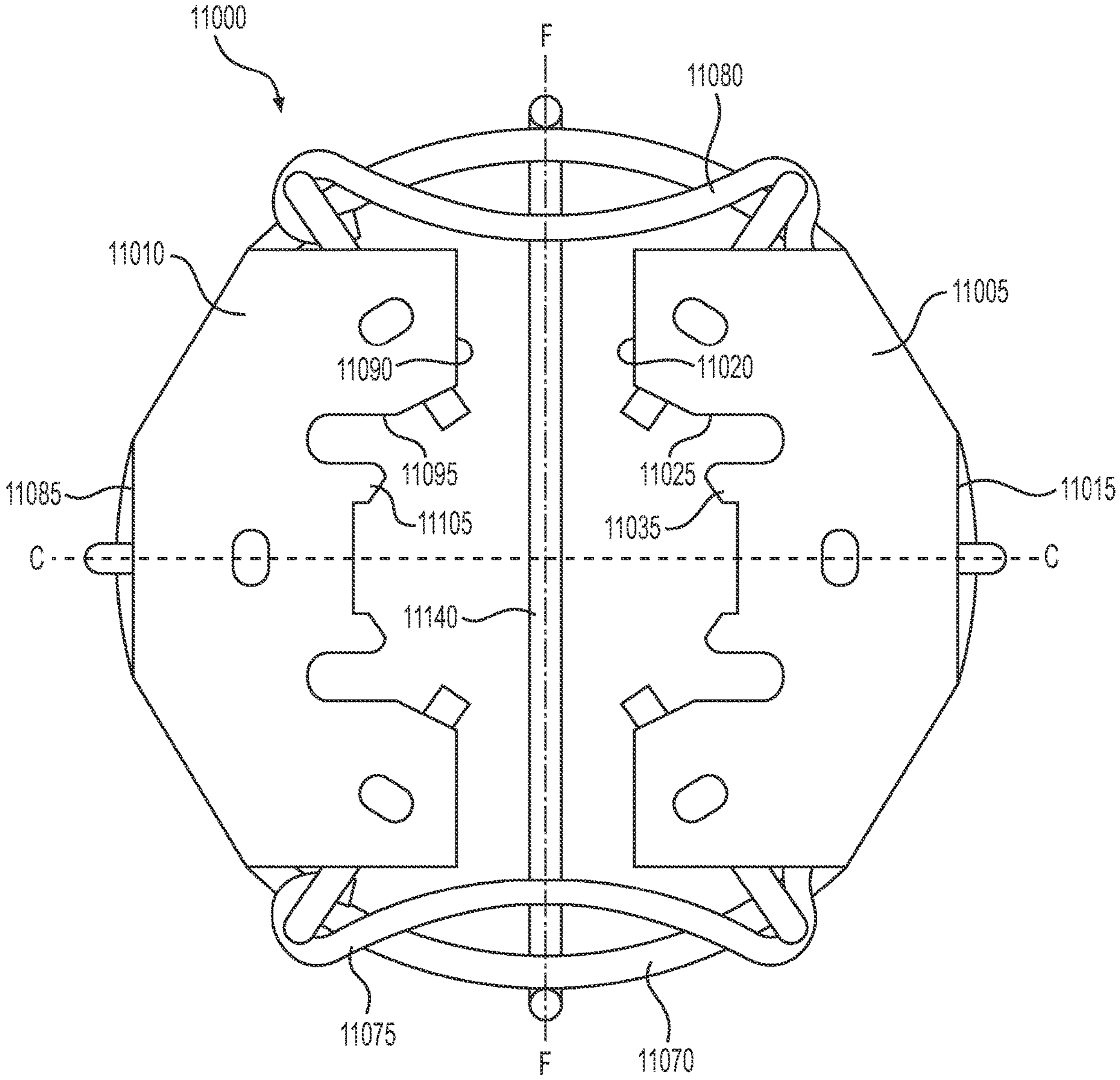
FIG. 11 is a top view of the sprinkler guard in the latched state, according to the second embodiment of the invention.

As shown in FIG. 10, the cross bar 10140 runs parallel to the axis F, within the plane E-E defined by the circular ring 10070. The cross bar 10140 is connected to the circular ring 10070, rather than the lower ends 10055*b*, 10125*b* of the second leg 10055 and the fifth leg 10125.

The sprinkler guard 10000 of this embodiment is adapted for use with an ESFR fire protection sprinkler having a K-factor of approximately 22 gpm/(psi)$^{1/2}$ (K-22 ESFR sprinkler), manufactured by The Reliable Automatic Sprinkler Co., Inc. The K-22 ESFR sprinkler (not shown) differs from the K-25 ESFR sprinkler in both the K-factor, and in the orientation of the tabs of the deflector. That is, the tabs of the deflector of the K-22 ESFR sprinkler extend along the axis F, shown in FIG. 10. Frame arms (not shown) of the K-22 ESFR sprinkler also extend along the axis F. Positioning the cross bar 10140 along the axis F reduces the interference of the sprinkler guard 10000 with the spray pattern that is formed by the deflector of the K-22 ESFR sprinkler. Thus, the sprinkler guard 10000 according to the second embodiment can be used to protect a K-22 ESFR sprinkler from physical damage, while ensuring that the K-22 ESFR sprinkler meets the testing requirements set forth in the relevant standards discussed herein, such as UL 1767 and FM Global 2008.

In each embodiment, the sprinkler guard may be formed of metal, such as steel. Of course, other materials may be used to form the sprinkler guard, as long as the material is sufficiently flexible so as to allow for mounting of the sprinkler guard to the fire protection sprinkler, and to allow for snap fitting of the swing arms into the indented portions of the legs of the sprinkler guard.

In addition, although the sprinkler guard described with respect to the first embodiment is suitable for use with a K-25 ESFR sprinkler manufactured by The Reliable Automatic Sprinkler Co., Inc., the sprinkler guard may be used with other fire protection sprinklers. Similarly, although the sprinkler guard described with respect to the second embodiment is suitable for use with a K-22 ESFR sprinkler manufactured by The Reliable Automatic Sprinkler Co., Inc., the sprinkler guard may be used with other fire protection sprinklers.

While the present invention has been described with respect to what are, at present, considered to be the preferred embodiments, it is to be understood that the invention is not limited to the disclosed embodiments. To the contrary, the invention is intended to cover various modifications and equivalent arrangements included within the spirit and scope of the appended claims.

We claim:

1. A sprinkler guard that is mountable to a fire protection sprinkler, the sprinkler guard comprising:

(a) a first plate having (i) one or more projections that extend from the first plate in a first lateral direction that is orthogonal to a central axis, and (ii) a lower surface facing a downward direction that is opposite to the upward direction;

(b) a second plate having (i) one or more projections that extend from the second plate in a second lateral direction that is opposite to the first lateral direction, and (ii) a lower surface facing the downward direction;

(c) a first leg having (i) an upper end attached to the lower surface of the first plate, the upper end extending in an inward radial direction that is orthogonal to and toward the central axis, (ii) a middle portion extending in the downward direction, and (iii) a lower end;

(d) a second leg having (i) an upper end attached to the lower surface of the first plate, the upper end extending in an inward radial direction that is orthogonal to and toward the central axis, (ii) a middle portion extending in the downward direction, and (iii) a lower end;

(e) a third leg having (i) an upper end attached to the lower surface of the second plate, the upper end extending in an inward radial direction that is orthogonal to and toward the central axis, and that is opposite to the first inward radial direction, (ii) a middle portion extending in the downward direction, and (iii) a lower end;

(f) a fourth leg having (i) an upper end attached to the lower surface of the second plate, the upper end extending in an inward radial direction that is opposite to the second inward radial direction, (ii) a middle portion extending in the downward direction, and (iii) a lower end; and (g) a circular ring that is attached to each of the lower ends of the first to fourth legs, a center of the circular ring coinciding with the central axis, and the first to fourth legs being spaced apart about the circumference of the circular ring.

2. The sprinkler guard according to claim 1, wherein the upper end of the first leg and the upper end of the second leg extend along a first inward radial direction and a second inward radial direction, respectively, so as to be closer to the central axis than an inner peripheral surface of the first plate.

3. The sprinkler guard according to claim 2, wherein the upper end of the third leg and the upper end of the fourth leg extend along a third inward radial direction and a fourth inward radial direction, respectively, so as to be closer to the central axis than an inner peripheral surface of the second plate.

4. The sprinkler guard according to claim 1, further comprising (h) a fifth leg having (1) an upper end attached to the lower surface of the first plate, the upper end extending in an inward radial direction that is orthogonal to and toward the central axis and parallel to the first lateral direction, (2) a middle portion extending in the downward direction, and (3) a lower end extending in an inward radial direction, the fifth leg being provided between the first leg and the second leg and being equally spaced from the first leg and the second leg.

5. The sprinkler guard according to claim 4, further comprising (i) a sixth leg having (1) an upper end attached to the lower surface of the second plate, the upper end extending in an inward radial direction, (2) a middle portion extending in the downward direction, and (3) a lower end extending in an inward radial direction, the sixth leg being provided between the third leg and the fourth leg and being equally spaced from the third leg and the fourth leg, wherein the lower end of the fifth leg and the lower end of the sixth leg are attached to the circular ring.

6. The sprinkler guard according to claim 1, further comprising (h) a cross bar that is attached to a lower surface of the circular ring, the cross bar extending along a diameter of the circular ring and along an axis that is orthogonal to the central axis and parallel to the first and second lateral directions.

7. The sprinkler guard according to claim 1, further comprising (h) a cross bar that is attached to the circular ring, the cross bar extending along a diameter of the circular ring and along an axis that is perpendicular to the central axis and perpendicular to the first and second lateral directions.

8. The sprinkler guard according to claim 7, wherein the upper end of the first leg and the upper end of the second leg extend along a first inward radial direction and a second inward radial direction, respectively, so as to be closer to the central axis than an inner peripheral surface of the first plate.

9. The sprinkler guard according to claim 8, wherein the upper end of the third leg and the upper end of the fourth leg extend along a third inward radial direction and a fourth inward radial direction, respectively, so as to be closer to the central axis than an inner peripheral surface of the second plate.

10. The sprinkler guard according to claim 7, further comprising (i) a fifth leg having (1) an upper end attached to the lower surface of the first plate, the upper end extending in an inward radial direction that is orthogonal to and toward the central axis and parallel to the first lateral direction, (2) a middle portion extending in the downward direction, and (3) a lower end extending in an inward radial direction, the fifth leg being provided between the first leg and the second leg and being equally spaced from the first leg and the second leg.

11. The sprinkler guard according to claim 10, further comprising (j) a sixth leg having (1) an upper end attached to the lower surface of the second plate, the upper end extending in an inward radial direction, (2) a middle portion extending in the downward direction, and (3) a lower end extending in the sixth inward radial direction, the sixth leg being provided between the third leg and the fourth leg and being equally spaced from the third leg and the fourth leg, wherein the lower end of the fifth leg and the lower end of the sixth leg are attached to the circular ring.

12. The sprinkler guard according to claim 1, further comprising (h) a first arm connected to the middle portion of the first leg, and (i) a second arm connected to the middle portion of the second leg.

13. A method of manufacturing a sprinkler guard, the method comprising the steps of:

(a) providing a first plate having (i) one or more projections that extend from the first plate in a first lateral direction that is orthogonal to a central axis, and (ii) a lower surface facing a downward direction that is opposite to the upward direction;

(b) providing a second plate having (i) one or more projections that extend from the second plate in a second lateral direction that is opposite to the first lateral direction, and (ii) a lower surface facing the downward direction;

(c) providing a first leg having (i) an upper end attached to the lower surface of the first plate, the upper end extending in an inward radial direction that is orthogonal to and toward the central axis, (ii) a middle portion extending in the downward direction, and (iii) a lower end;

(d) providing a second leg having (i) an upper end attached to the lower surface of the first plate, the upper end extending in an inward radial direction that is orthogonal to and toward the central axis, (ii) a middle portion extending in the downward direction, and (iii) a lower end;

(e) providing a third leg having (i) an upper end attached to the lower surface of the second plate, the upper end extending in an inward radial direction that is orthogonal to and toward the central axis, and that is opposite to the first inward radial direction, (ii) a middle portion extending in the downward direction, and (iii) a lower end;

(f) providing a fourth leg having (i) an upper end attached to the lower surface of the second plate, the upper end extending in an inward radial direction that is orthogonal to and toward the central axis, and that is opposite to the second inward radial direction, (ii) a middle portion extending in the downward direction, and (iii) a lower end; and (g) providing a circular ring that is attached to each of the lower ends of the first to fourth legs, a center of the circular ring coinciding with the central axis, and the first to fourth legs being spaced apart about the circumference of the circular ring.

14. The method of manufacturing a sprinkler guard according to claim 13, wherein the upper end of the first leg and the upper end of the second leg extend along a first inward radial direction and a second inward radial direction, respectively, so as to be closer to the central axis than an inner peripheral surface of the first plate.

15. The method of manufacturing a sprinkler guard according to claim 14, wherein the upper end of the third leg and the upper end of the fourth leg extend along a third inward radial direction and a fourth inward radial direction, respectively, so as to be closer to the central axis than an inner peripheral surface of the second plate.

16. The method of manufacturing a sprinkler guard according to claim 13, further comprising (h) providing a fifth leg having (1) an upper end attached to the lower surface of the first plate, the upper end extending in an inward radial direction that is orthogonal to and toward the central axis and parallel to the first lateral direction, (2) a middle portion extending in the downward direction, and (3) a lower end extending in an inward radial direction, the fifth leg being provided between the first leg and the second leg and being equally spaced from the first leg and the second leg.

17. The method of manufacturing a sprinkler guard according to claim 16, further comprising (i) providing a sixth leg having (1) an upper end attached to the lower surface of the second plate, the upper end extending in an inward radial direction, (2) a middle portion extending in the downward direction, and (3) a lower end extending in an inward radial direction, the sixth leg being provided between the third leg and the fourth leg and being equally spaced from the third leg and the fourth leg, wherein the lower end of the fifth leg and the lower end of the sixth leg are attached to the circular ring.

18. The method of manufacturing a sprinkler guard according to claim 13, further comprising (h) providing a cross bar that is attached to a lower surface of the circular ring, the cross bar extending along a diameter of the circular ring and along an axis that is orthogonal to the central axis and parallel to the first and second lateral directions.

19. The method of manufacturing a sprinkler guard according to claim 13, further comprising (h) providing a cross bar that is attached to the circular ring, the cross bar extending along a diameter of the circular ring and along an axis that is perpendicular to the central axis and perpendicular to the first and second lateral directions.

20. The method of manufacturing a sprinkler guard according to claim 13, wherein the upper end of the first leg and the upper end of the second leg extend along a first inward radial direction and a second inward radial direction, respectively, so as to be closer to the central axis than an inner peripheral surface of the first plate.

21. The method of manufacturing a sprinkler guard according to claim 20, wherein the upper end of the third leg and the upper end of the fourth leg extend along a third inward radial direction and a fourth inward radial direction, respectively, so as to be closer to the central axis than an inner peripheral surface of the second plate.

22. The method of manufacturing a sprinkler guard according to claim 13, further comprising (h) providing a fifth leg having (1) an upper end attached to the lower surface of the first plate, the upper end extending in an inward radial direction that is orthogonal to and toward the central axis and parallel to the first lateral direction, (2) a middle portion extending in the downward direction, and (3) a lower end extending in an inward radial direction, the fifth leg being provided between the first leg and the second leg and being equally spaced from the first leg and the second leg.

23. The method of manufacturing a sprinkler guard according to claim 22, further comprising (i) providing a sixth leg having (1) an upper end attached to the lower surface of the second plate, the upper end extending in an inward radial direction, (2) a middle portion extending in the downward direction, and (3) a lower end extending in an inward radial direction, the sixth leg being provided between the third leg and the fourth leg and being equally spaced from the third leg and the fourth leg, wherein the lower end of the fifth leg and the lower end of the sixth leg are attached to the circular ring.

24. The method of manufacturing a sprinkler guard according to claim 13, further comprising (h) connecting a first arm to the middle portion of the first leg, and (i) connecting a second arm to the middle portion of the second leg.

* * * * *